(12) United States Patent
Purdy et al.

(10) Patent No.: US 11,267,718 B2
(45) Date of Patent: Mar. 8, 2022

(54) SYNTHETIC CAUSTIC COMPOSITION

(71) Applicant: FLUID ENERGY GROUP LTD., Calgary (CA)

(72) Inventors: Clay Purdy, Medicine Hat (CA); Markus Weissenberger, Calgary (CA)

(73) Assignee: Fluid Energy Group Ltd., Calgary (CA)

( * ) Notice: Subject to any disclaimer, the term of this patent is extended or adjusted under 35 U.S.C. 154(b) by 481 days.

(21) Appl. No.: 16/189,589

(22) Filed: Nov. 13, 2018

(65) Prior Publication Data

US 2019/0144739 A1 May 16, 2019

(30) Foreign Application Priority Data

Nov. 15, 2017 (CA) ................ CA 2985622

(51) Int. Cl.
| | |
|---|---|
| *C09K 8/66* | (2006.01) |
| *C01D 1/04* | (2006.01) |
| *C09K 8/68* | (2006.01) |
| *C09K 8/70* | (2006.01) |
| *C09K 8/74* | (2006.01) |
| *C10G 1/04* | (2006.01) |
| *C10G 19/067* | (2006.01) |
| *C09K 8/80* | (2006.01) |
| *E21B 43/267* | (2006.01) |

(52) U.S. Cl.
CPC ............. *C01D 1/04* (2013.01); *C09K 8/665* (2013.01); *C09K 8/685* (2013.01); *C09K 8/70* (2013.01); *C09K 8/74* (2013.01); *C09K 8/80* (2013.01); *C10G 1/04* (2013.01); *C10G 19/067* (2013.01); *E21B 43/267* (2013.01)

(58) Field of Classification Search
CPC ........................................................ C09K 8/00
See application file for complete search history.

(56) References Cited

U.S. PATENT DOCUMENTS

| | | |
|---|---|---|
| H468 H | 5/1988 | Malik et al. |
| 4,830,716 A | 5/1989 | Ashmead |
| 4,976,315 A | 12/1990 | Prukop |
| 5,804,541 A | 9/1998 | Jans |
| 6,387,864 B1 | 5/2002 | Bartelme |
| 7,073,519 B2 | 7/2006 | Choi et al. |
| 7,084,093 B2 | 8/2006 | Crews |
| 7,902,137 B2 | 3/2011 | Kneipp et al. |
| 9,399,589 B2 | 7/2016 | MacDonald |
| 9,441,129 B2 * | 9/2016 | Katoh .................. C09D 11/38 |
| 2004/0022792 A1 | 2/2004 | Klinke et al. |
| 2009/0031775 A1 | 2/2009 | Bevans et al. |
| 2011/0256085 A1 | 10/2011 | Talingting Pabalan et al. |

(Continued)

OTHER PUBLICATIONS

Official Action for U.S. Appl. No. 16/189,568, dated Mar. 24, 2020 8 pages Restriction Requirement.

(Continued)

*Primary Examiner* — William D Hutton, Jr.
*Assistant Examiner* — Avi T Skaist
(74) *Attorney, Agent, or Firm* — Sheridan Ross P.C.

(57) ABSTRACT

An aqueous caustic composition comprising: a caustic component; an alkanolamine additive adapted to provide an extended buffering effect to the caustic composition when such is exposed to acid; and water. Uses and methods of using such compositions are also disclosed.

18 Claims, 1 Drawing Sheet

(56) References Cited

U.S. PATENT DOCUMENTS

| | | |
|---|---|---|
| 2013/0324443 A1 | 12/2013 | Wang et al. |
| 2014/0166586 A1 | 6/2014 | Sikes |
| 2015/0183669 A1 | 7/2015 | MacDonald |
| 2017/0204316 A1 | 7/2017 | Pop et al. |
| 2018/0127633 A1 | 5/2018 | Burakowska et al. |
| 2019/0144293 A1 | 5/2019 | Purdy et al. |
| 2019/0144740 A1 | 5/2019 | Purdy et al. |
| 2019/0144741 A1 | 5/2019 | Purdy et al. |

OTHER PUBLICATIONS

Official Action for U.S. Appl. No. 16/189,568, dated Jun. 12, 2020 10 pages.
Official Action for U.S. Appl. No. 16/189,541, dated Feb. 7, 2020 8 pages Restriction Requirement.
Official Action for U.S. Appl. No. 16/189,541, dated Apr. 8, 2020 17 pages.
Official Action for U.S. Appl. No. 16/189,541, dated Aug. 19, 2020 20 pages.
Official Action for U.S. Appl. No. 16/189,611, dated Mar. 24, 2020 9 pages Restriction Requirement.
Official Action for U.S. Appl. No. 16/189,611, dated Jun. 15, 2020 12 pages.
Notice of Allowance for U.S. Appl. No. 16/189,568, dated Oct. 5, 2020 10 pages.
Notice of Allowance for U.S. Appl. No. 16/189,611, dated Nov. 16, 2020 5 pages.
Notice of Allowance for U.S. Appl. No. 16/189,541, dated Feb. 24, 2021 10 pages.

\* cited by examiner

SYNTHETIC CAUSTIC COMPOSITION

CROSS-REFERENCE TO RELATED APPLICATIONS

This application claims the benefit of Canadian Patent Application No. 2,985,622 filed Nov. 15, 2017, the entire contents of which are incorporated herein by reference in its entirety.

FIELD OF THE INVENTION

The present invention is directed to a novel synthetic caustic composition, more specifically a novel composition comprising a caustic component and an additive adapted to provide an extended and linear buffering effect.

BACKGROUND OF THE INVENTION

Caustic compositions have a wide variety of uses in the oil and gas industry. They can be used for pH control in aqueous solutions as well as to control alkalinity. Caustic compositions also find other varied uses which includes, among others, breaking down of organic matter and removing various impurities in the refining stage of petroleum production. The impurities it can be most effectively used to remove include carbon dioxide and various sulfur-containing compounds. Removal of sulfur-containing compounds is also referred to in the industry as sweetening the petroleum. Some hydroxides can be highly hazardous materials to handle because they are very hygroscopic and typically have a high exothermic reaction with other fluids, especially low pH fluids. Sodium hydroxide is soluble in water, ethanol and methanol. These solutions can cause severe, irreversible dermal/ocular burns. Sodium hydroxide may cause chemical conjunctivitis and corneal damage. Severe eye burns with clouding of the surface, and ensuing blindness may occur from exposure to liquid sodium hydroxide. Low concentration levels of mists or aerosols cause burning discomfort, spasmodic blinking or involuntary closing of the eyelids, redness, and tearing. At room temperature sodium hydroxide is a white crystalline, odorless, deliquescent solid, which absorbs moisture from the air. When sodium hydroxide is dissolved in water, often a mist is formed. Sodium hydroxide itself is nonflammable, but in contact with moisture it may ignite combustibles. Toxic fumes may be formed upon heating. The solid, solutions, mists, and aerosols are all corrosive.

Sodium hydroxide (widely utilized) is available commercially in a solid (sodium hydroxide is most commonly sold as flakes, prills, and cast blocks) or a liquid solution (normally a 50% strength). Typically, in an oil & gas drilling application a solid bead or flake is added to a mixing barrel with water until solubilized and then added to the mud system or fluid system to increase the pH for various reasons, such as to limit the precipitation of calcium and magnesium from a hard water source, limit the incompatibility of the fluid system with formation clays/shales and reduce swelling. Another advantage of a liquid sodium hydroxide is the liberation of hydrogen sulfide and carbon dioxide gases from a fluid system. Having an alternative product that is lower hazard and more environmentally responsible is advantageous due to the high level of human exposure, and the fact that drill cuttings (that have residuals of the mud system) are often spread over agricultural fields as a disposal technique.

A 50% sodium hydroxide solution is widely utilized in the bitumen extraction process with relation to oil-sands development. Most commercial mineable oil sands producers use an extraction method "Clarks Hot Water Extraction" process which was developed in the 1920s. One of the major operational disadvantages of a 50% sodium hydroxide solution is that it begins to freeze at −13 degrees Celsius and a 25% solution will freeze at −17 Celsius. It is therefore advantageous to have a product with a much lower freeze point, as low as −20 Celsius. As the waste fluids are intentional or unintentionally released into the environment post treatment, having a product that is more environmentally responsible, low toxicity and lower hazard to handle is highly advantageous. Volumes in excess of 200,000 gallons/day are utilized in the Canadian Oil Sands, and the technical and environmental advantages for a product with these constituents are substantial.

Alkaline Surfactant Polymer (ASP) flood applications utilize a high pH fluid to aid in reservoir recovery. Having a product that is non-hazardous is an advantage. ASP formulation typically consists of about 0.5-1% alkali, 0.1% surfactant and 0.1% polymer. The alkaline component reacts with the acidic moieties that exist in the oil creating natural soap and also helps reduce the adsorption of the surfactant on the rock.

Borate crosslinked gel fracturing fluids utilize borate ions to crosslink the hydrated polymers and provide increased viscosity. The polymers most often used in these fluids are guar and HPG. The crosslink obtained by using borate is reversible and is triggered by altering the pH of the fluid system (increasing the pH generates the crosslink function, decreasing the pH eliminates the crosslink). The reversible characteristic of the crosslink in borate fluids helps them clean up more effectively, resulting in good regained permeability and conductivity.

Some of the major challenges faced in the oil & gas industry with respect to the use of conventional hydroxides include the following: high levels of corrosion on certain metals which are typically countered by the use of High Density Polyurethane (HDPE) components, intensive and expensive maintenance schedules—environment and equipment; reactions between hydroxides and various types of metals can vary greatly but with certain metals, such as aluminum, effects are substantial causing immediate damage. As caustics are utilized to control pH levels in many systems throughout the life cycle of a well, exposure to these metals can happen often resulting in substantial replacement costs. This renders typical hydroxide blends as controlled in most jurisdictions and require extensive labeling/handling and transportation procedures which can add to the end user costs. Additionally, the high toxicity levels of hydroxides render them banned in many offshore operations due to concerns over unintentional release into sensitive ocean ecosystems.

Like other highly corrosive alkalis, sodium hydroxide solutions can decompose proteins and lipids in skin, eyes or other living tissues via amide hydrolysis and ester hydrolysis, which consequently causes chemical burns and may induce permanent blindness if it contacts eye tissue. Solid alkali may also express its corrosive nature if there is water present on the skin or in the eyes. Sodium hydroxide is corrosive to several metals, like aluminum which reacts with the alkali to produce flammable hydrogen gas on contact. Having an alternative that is much less corrosive to metals, has a far lower freeze point, has a linear pH control effect and provides a period of human dermal tissue protection is advantageous. Having one of these advantages is desirable, having more than one is even more so.

The inherent environmental effects (organic sterility, poisoning of wildlife etc.) of caustics in the event of an unintended/accidental release on surface or downhole into water aquifers or sources of water are devastating which can cause significant pH increase of such and can substantially increase the toxicity and could potentially cause a mass culling of aquatic species and potential poisoning of humans/livestock and wildlife exposed to/or drinking the water. An unintended release at surface can also cause damaging fumes to be released, potentially endangering human and animal health. This is a common event at large storage sites when tanks split or leak. Typically, if near the public, large areas need to be evacuated post event.

The inability for many caustics and blends of such to biodegrade naturally without irreversibly damaging the soil, results in expensive cleanup-reclamation costs for the operator should an unintended release occur. Moreover, the fumes produced by many bases are harmful to humans/animals and are highly corrosive and/or explosive potentially, transportation and storage requirements for liquid bases are restrictive and taxing in such that you must typically haul the products in tankers or intermediate bulk containers (IBC) that are rated to handle such corrosive-regulated products, creating exposure dangers for personnel having to handle them. Sodium hydroxide and its solutions, mists, and aerosols are rapidly damaging when they come in contact with the eyes, skin, and upper respiratory tract causing irritation, burns, coughing, chest pain and dyspnea. Swelling of the throat and accumulation of fluid in the lungs (shortness of breath, cyanosis, and expectoration) may occur. Ingestion of sodium hydroxide can cause severe corrosive injury to the lips, mouth, throat, esophagus, and stomach. There is no antidote to be administered to counteract the effects of sodium hydroxide. Treatment consists of supportive measures.

Price fluctuations with typical commodity caustics based on industrial output causing end users an inability to establish long term costs in their respective budgets; severe reaction with dermal/eye tissue; major PPE requirements (personal protective equipment) for handling, such as on site shower units; extremely high corrosion rates, the need for constant expensive heating of liquid solutions and the aggressive non-linear raising of pH are some of the negatives to the industry standard bases utilized, such as sodium hydroxide.

When used to control the pH levels on surface of water/fluid systems, caustics are exposed to humans and mechanical devices as well as expensive pumping equipment causing increased risk for the operator and corrosion effects that damage equipment and create hazardous hydrogen gas when they come into contact with water or aluminum. When mixed with acidic or lower pH fluids, caustics will create a large amount of thermal energy (exothermic reaction) causing potential safety concerns and equipment damage, caustics typically need to be blended with fresh water to the desired concentration requiring companies to sometimes pre-blend off-site as opposed to blending on-site, greatly thereby increasing costs associated with transportation.

Typical caustics used in a pH control situation can or will cause degradation of certain polymers/additives/systems/formations requiring further chemicals to be added to counter these potentially negative effects, many offshore areas of operations have very strict regulatory rules regarding the transportation/handling and deployment of caustics causing greatly increased liability and costs for the operator. Caustics or high pH fluids, such as caustic water can be destructive to many typical elastomers found in the oil & gas industry such as blow out preventers (BOP's)/downhole tools/packers/submersible pumps/seals, surface pumps and tank equipment etc., having to deal with high pH fluids during the back flush/disposal process is also very expensive.

Caustics perform many actions in the oil & gas industry and are considered necessary to achieve the desired production of various petroleum wells, maintain their respective systems and aid in certain functions (i.e. suppressing calcium & magnesium in hard waters). The associated dangers that come with using caustics are expansive and tasking to mitigate through controls whether they are chemically or mechanically engineered.

Eliminating or even simply reducing the negative effects of caustics while maintaining their performance level is a struggle for the industry. As the public demand for the use of cleaner/safer/greener products increases, companies are looking for alternatives that perform the required function without all or most of the drawbacks associated with the use of caustics.

U.S. Pat. No. 7,073,519 discloses a facility parts cleaning composition for the processing of (meth)acrylic acid and/or (meth)acrylic esters comprising an alkali metal hydroxide solution, a water-soluble amino acid, N,N'-methylene bisacrylamide, and azobisisobutyronitrile, and a cleaning method using the cleaning solution composition. Disclosed are compositions including 5 to 50 wt % of at least one alkali metal hydroxide selected from the group consisting of sodium hydroxide and potassium hydroxide, 0.01 to 1 wt % of a water-soluble amino acid, 0.001 to 0.05 wt % of N,N'-methylene bisacrylamide, and 0.001 to 0.05 wt % of azobisisobutyronitrile.

US Statutory Invention Registration no. H468 entitled "Alkaline hard-surface cleaners containing alkyl glycosides" discloses a cleaning composition comprising: (a) about 0.1 to 50 weight percent alkali metal hydroxide or ammonium hydroxide; (b) about 0.1 to 40 weight percent alkyl glycoside; and (c) about 10 to 95 weight percent water.

U.S. Pat. No. 6,387,864 discloses a laundry detergent composition comprising about 1 to about 75 parts by weight of at least one caustic compound, about 0.5 to about 50 parts by weight of at least one nonionic surfactant, about 1 to about 35 parts by weight of at least one primary amine compound.

U.S. Pat. No. 5,804,541 discloses a floor stripper composition is provided, having a pH-value above 9.0, and comprising a soap, water and a glycine-N,N-diacetic acid compound, which is preferably methylglycine diacetic acid (MGDA). The diacetic acid is desirably in the form of a divalent metal complex thereof. The description states that a good floor stripper performance could be obtained with this composition owing to its low foaming behaviour.

U.S. Pat. No. 9,399,589 B2 teaches the use of glycine in the making of a synthetic base that is said to obviate all the drawbacks of strong bases such as sodium hydroxide. It is stated that the compound is made by dissolving glycine in water and adding calcium hydroxide at a molar ratio of about 1:1. Sodium percarbonate is then dissolved in the solution to produce the new compound.

Since several operations in the oil industry expose fluids and equipment to very high temperatures (some upward of 200° C.), the caustic compositions used in these various operations need to withstand these high temperatures without losing their effectiveness. These compositions must be capable of being used in operations over a wide range of temperatures while not affecting the equipment or people it comes in contact with.

Consequently, there is still a need for compositions for use in the oil industry which can be used over a range of applications which can decrease a number of the associated dangers/issues typically associated with caustic applications to the extent that these caustic compositions are considered much safer for handling on worksites. The present invention seeks to overcome some of drawbacks of the prior art caustic compositions and methods using such caustic compositions.

SUMMARY OF THE INVENTION

According to a first aspect of the present invention, there is provided a caustic composition comprising:
 a caustic component;
 an alkanolamine additive adapted to provide an extended (more methodical and linear) buffering effect to the caustic composition as well as greatly lowering the freeze point and providing an increased level of dermal protection; and
 water Preferably, the caustic component is selected from the group consisting of: potassium hydroxide; sodium hydroxide; lithium hydroxide; cesium hydroxide; and combinations thereof. Calcium hydroxide is less desirable to use as it displays low stability and a strong tendency to precipitate out of solution. More preferred caustic component is selected from the group consisting of: sodium hydroxide and potassium hydroxide. Preferably, the caustic component is present in a concentration of up to 40 wt % of the composition. Preferably also, the caustic component is present in a concentration ranging from 5 to 40 wt % of the composition. More preferably, the caustic component is present in a concentration ranging from 10 to 30 wt % of the composition. Even more preferably, the caustic component is present in a concentration ranging from 15-25 wt % of the composition. Yet even more preferably, the caustic component is present in a concentration of approximately 25 wt % of the composition.

Preferably, the main components in terms of volume and weight percent of the composition of the present invention comprise strong base, such as NaOH, KOH, LiOH, CsOH, RbOH and an alkanolamine additive. An alkanolamine according to the present invention contains at least one amino group, $—NH_2$, and one alcohol group, $—OH$.

Preferred alkanolamines according to the present invention include, but are not limited to, monoethanolamine, diethanolamine, triethanolamine, aminomethyl propanol, propanolamine, dimethylethanolamine, N-methylethanolamine. More preferred are monoethanolamine, diethanolamine. Most preferred is monoethanolamine.

When adding an alkanolamine to a strong base, there is the formation of an adduct which greatly reduces the hazardous effects of the sodium hydroxide on its own, such as the fuming effect, the hygroscopicity, and the highly corrosive nature. The excess nitrogen can also act as a corrosion inhibitor at higher temperatures.

The molar ratio of the two main components can be adjusted or determined depending on the intended application and the desired solubilizing ability. According to a preferred embodiment where the caustic is NaOH, one can increase the ratio of the NaOH component to increase the solubilizing ability of the composition while still providing at least one of the following advantages: health; safety; environmental; and operational advantages over sodium hydroxide.

While an alkanolamine such as monoethanolamine is a compound known by the person of ordinary skill in the art, the latter knows that such a compound is not to be mixed with a strong base such as NaOH. In fact, the person skilled in the art will note upon review of the DOW safety data sheet for monoethanolamine LFG 85 that it indicates that one must avoid contact of this compound with strong bases.

Preferably, the additive is present in a concentration ranging from 2 wt % to 25 wt % of the composition. More preferably, additive is present in a concentration ranging from 4 wt % to 15 wt % of the composition. Yet even more preferably, the additive is present in a concentration ranging from 4 wt % to 10 wt % of the composition.

According to another aspect of the present invention, there is provided a method of fracking a hydrocarbon-bearing formation using a crosslinked polymer gel, said method comprising the steps of:
 providing a hydrocarbon-bearing formation;
 providing a polymer;
 providing a cross-linking activator and adding such to the polymer;
 adding to the polymer mixture a caustic composition comprising:
  a caustic component;
  an alkanolamine additive adapted to provide an extended and more linear buffering effect to the caustic composition when such is exposed to the fluid system; and
  water;
 adding a proppant to the resulting polymer mixture; and
 injecting said resulting polymer-proppant composition into the formation.

Preferably, the caustic component is present in amount of up to 50 wt % of the caustic composition.

Preferably, the crosslinking component is a borate ion or a zirconate ion. Preferably, the polymer is a guar gum, Carboxymethyl guar gum, Hydroxymethyl guar gum; Hydroxypropylethyl guar gum; O-carboxymethyl-O-hydroxypropyl guar gum (CMHPG); Ammonium hydroxyl propyl trimethyl chloride of guar gum; O-carboyxymethyl-O-2 hydroxy-3-(trimethylammonia propyl) guar gum (CMHTPG); Acryloyloxy guar gum; Methacryloyl guar gum; Guar gum esters such as Hydroxy Propyl Guar (HPG), Carboxy Methyl Guar (CMG), Carboxy Methyl Hydroxy Propyl Guar (CMHPG), and Guar.

According to another aspect of the present invention, there is provided a method of removing impurities present in petroleum during the refining thereof, said method comprising the steps of:
 providing a petroleum product to be refined;
 providing a caustic composition comprising:
  a caustic component;
  an alkanolamine additive adapted to provide an extended and more linear buffering effect to the caustic composition when such is exposed to acid; and
  water;
 adding said caustic composition to said petroleum product to be refined; and
 allowing said caustic composition and petroleum product to be refined to remain in contact with one another for a period of time determine to be sufficient for the sufficient removal of at least one of carbon dioxide and sulfur-containing compounds.

According to another aspect of the present invention, there is provided a use of a composition according to a preferred embodiment of the present invention for the control the pH of water-based drilling fluids.

According to another aspect of the present invention, there is provided a use of a composition according to a preferred embodiment of the present invention for the breaking down of organic matter present in petroleum during the refining thereof.

According to another aspect of the present invention, there is provided a use of the composition according to a preferred embodiment of the present invention for the removal of various impurities during the refining stage of petroleum production. Preferably, the impurities are selected from the group consisting of: include: carbon dioxide and sulfur-containing compounds.

According to another aspect of the present invention, there is provided an aqueous caustic composition comprising:
  a caustic component;
  an alkanolamine additive adapted to provide an extended buffering effect to the caustic composition when such is exposed to acid; and
  water;
wherein the caustic component is present in a concentration of up to 40 wt % of the composition and the caustic component and the additive are present in a molar ratio ranging from 15:1 to 5:1.

Preferably, the caustic component and the alkanolamine additive are present in a molar ratio ranging from 12:1 to 8:1. Preferably also, the caustic component comprises a hydroxide anion and a monovalent cation.

According to another aspect of the present invention, there is provided a use of a buffered caustic solution in water treatment, wherein said buffered caustic solution comprising:
  a caustic component;
  an alkanolamine additive adapted to provide an extended buffering effect to the caustic composition when such is exposed to acid; and
  water;
  wherein the caustic component is present in a concentration of up to 40 wt % of the composition and the caustic component and the alkanolamine additive are present in a molar ratio ranging from 15:1 to 5:1;

According to another aspect of the present invention, there is provided a method to treat water, wherein said method comprises the steps of:
  providing an aqueous caustic composition comprising:
    a caustic component;
    an alkanolamine additive adapted to provide an extended buffering effect to the caustic composition when such is exposed to acid; and
    water;
  wherein the caustic component is present in a concentration of up to 40 wt % of the composition and the caustic component and the alkanolamine additive are present in a molar ratio ranging from 15:1 to 5:1;
  exposing a water requiring treatment to a pre-determined amount of said caustic composition for a period of time sufficient to effect the treatment intended.

BRIEF DESCRIPTION OF THE FIGURES

The invention may be more completely understood in consideration of the following description of various embodiments of the invention in connection with the accompanying figures, in which.

DESCRIPTION OF AN EMBODIMENT OF THE PRESENT INVENTION

Figure 1:
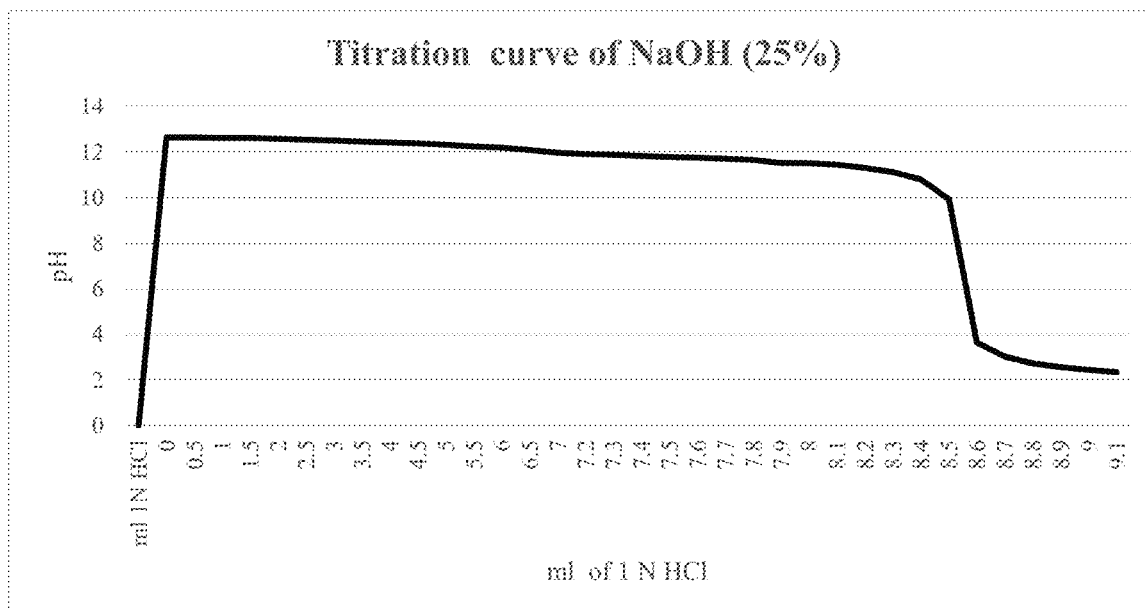
FIG. 1 depicts a caustic titration curve of NaOH (25 wt %) with no additive.

Borate crosslinked gel fracturing fluids utilize borate ions to crosslink the hydrated polymers and provide increased viscosity. The polymers most often used in these fluids are guar and HPG. The crosslink obtained by using borate is reversible and is triggered by altering the pH of the fluid system (increasing the pH generates the crosslink function, decreasing the pH eliminates the crosslink). The reversible characteristic of the crosslink in borate fluids helps them clean up more effectively, resulting in good regained permeability and conductivity. The present invention can be utilized in this situation; having a minimal negative effect on polymer chains. The latter is another advantage of a preferred embodiment of the present invention. Borate crosslinked fluids have proved to be highly effective in both low and high permeability formations.

To achieve an optimal crosslinking of borate crosslinked guar gel, a pH between 8.5 and 9.0 is necessary. This is a very narrow pH window. A common drawback of using neat caustic is that, as a strong base, a pH in that range can be quite difficult to adjust. A slight difference in dosage can result in a high pH shift, this results in the breakdown of the crosslinking in the gel.

In an attempt to overcome the drawback of using strong caustic agents in the presence of crosslinked gels, or at least to compensate and create a buffer which allows some flexibility in the dosage, a crosslinker and guar gum is added on location on the fly with special equipment.

According to a preferred embodiment of the present invention, it is desirable to have a buffered caustic solution, which enables one to adjust the pH more precisely in a desired range (in other words it is more forgivable in terms of overdosage). Such a buffer provides a substantial advantage over the use of a neat caustic composition According to another preferred embodiment of the present invention, it is desirable to have a buffered caustic solution in water treatment. Caustics such as sodium hydroxide can be used to raise the pH of water supplies. Increased pH renders the water less susceptible to corrode pipes and reduces the amount of free metals including copper and other metals which can be found in drinking water.

Example 1

Preparation of a Composition

A composition according to the present invention was prepared by providing 100 ml of 25 wt % NaOH solution. The NaOH solution is then mixed with the appropriate weight of additive, in this case, 5% of monoethanolamine (MEA), to obtain the desired weight % concentration. Mixing the resulting composition until one visually determines that solubilization is complete.

Titration of the Composition

The titration of the composition of Example 1 was performed in order to assess its buffering ability. In order to do so, 1 ml of the buffer (composition of Example 1) was drawn and placed in a flask, the buffer was then diluted in 100 ml of distilled water. The resulting solution was titrated with 1 N HCl standard. The pH was continuously recorded with a pH meter. The solution was gently stirred with a magnetic stir bar during the measurements. Prior to recording the pH after each addition of HCl, sufficient time was given to allow for the pH to stabilize.

Figure 2:
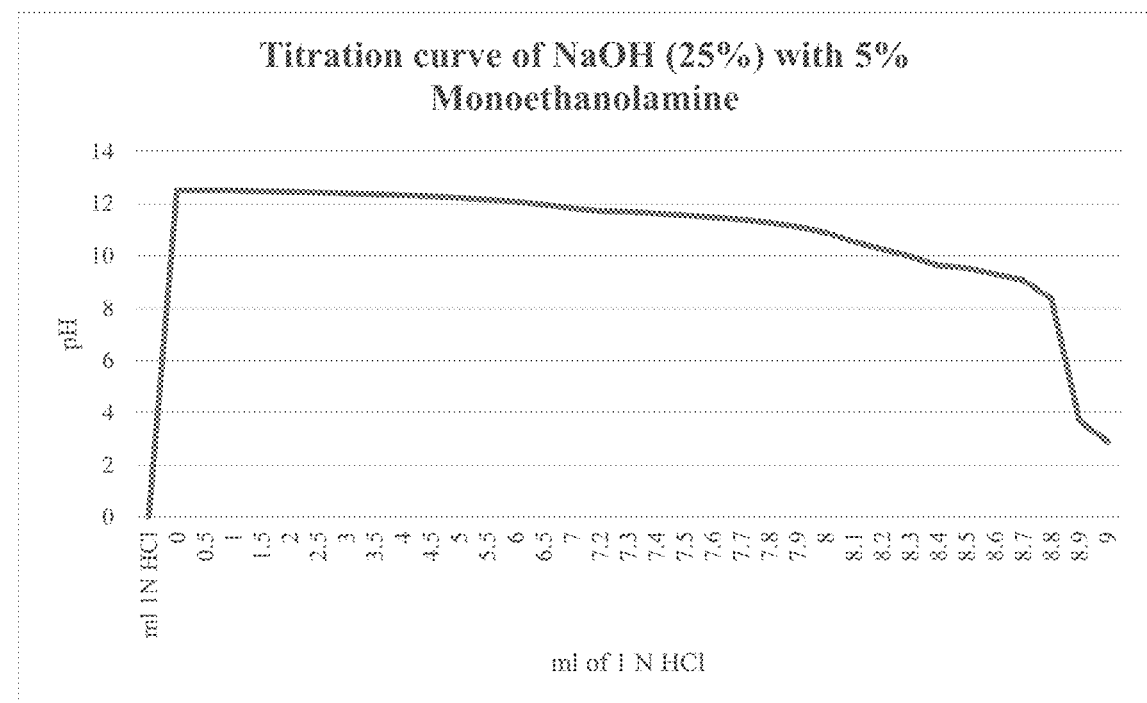
FIG. 2 depicts a titration curve of a composition according to a preferred embodiment of the present invention, said composition comprising NaOH (25 wt %) and 5 wt % MEA.

As can be seen by referring to FIGS. 1 to 2, a preferred embodiment of the present invention (set out in FIG. 2) displayed an extended buffering effect when exposed to acid addition as compared to caustic composition free of additive. This extended buffering effect translates into an increased ability to control the pH of crosslinked gels during fracking operations. This is even more advantageous when the pH adjustment is done on the fly. Preferred compositions of the present invention display a strong caustic character, an extended buffering effect (compared to neat caustic) and minimized dermal damage upon direct contact with human skin.

According to a preferred embodiment of the present invention, a composition comprising a caustic component, an additive such as MEA and water can buffer the pH drop of a 25 wt % caustic solution in the pH range of 8.25 to 10. Such a buffering effect is desirable in fracking operations to maintain the integrity of a guar gel based polymeric system. Also desirable is the number of components in the composition. This type of composition is desirable as it necessitates very few processing steps, which leads to decreased exposure to personnel.

According to another application of the composition according to the preferred embodiment of the present invention, a hot solution of the caustic composition according to a preferred embodiment of the present invention can be used to dissolve aluminium-containing minerals in the bauxite. This, as a result, forms a supersaturated solution of sodium aluminate. When the solution is cooled it will yield a solid form of sodium aluminate. This sodium aluminate can be employed in water treatment, in construction to accelerate the solidification of concrete, in the paper industry, to make fire bricks production, to manufacture alumina.

According to another preferred embodiment of the present invention, it is desirable to have a buffered caustic solution in water treatment. Caustics such as sodium hydroxide can be used to raise the pH of water supplies. Increased pH renders the water less susceptible to corrode pipes and reduces the amount of free metals including copper and other metals which can be found in drinking water.

According to another application of the composition according to the preferred embodiment of the present invention, there is provided a method for treating mine water from an ore deposit, wherein the mine water contains sodium carbonate and sodium bicarbonate, the method comprising:
  pumping the mine water from the ore deposit;
  introducing a tailings stream comprising an amount of the caustic composition according to a preferred embodiment of the present invention into the mine water to form a reaction solution;
  maintaining a pH of between about 11.5 and about 13 in the reaction solution;
  separating a treated mine water from the reaction solution to form a concentrate;
  introducing the treated mine water into an alkali production process.

According to a preferred embodiment of the present invention, a composition comprising MEA can have a freezing point in a temperature range of around −45° C. This is a substantial decrease in the freeze point compared to −18° C. for 25% NaOH. This proves to be highly desirable for winter operations in the oil and gas industry.

According to a preferred embodiment of the present invention, there is provided a method of fracking a hydrocarbon-bearing formation using a crosslinked polymer gel, said method comprising the steps of:
  providing a hydrocarbon-bearing formation;
  providing a polymer;
  providing a cross-linking activator and adding such to the polymer;
  adding to the polymer mixture a caustic composition comprising:
    a caustic component;
    an alkanolamine additive adapted to provide an extended buffering effect to the caustic composition when such is exposed to acid; and
    water;
  adding a proppant to the resulting polymer mixture; and
  injecting said resulting polymer-proppant composition into the formation. Preferably, the caustic component is present in amount of up to 50 wt % of the composition. Preferably, the crosslinking component is selected from the group consisting of: borate ions and zirconate ions. Preferably, the polymer is a guar gum.

According to a preferred embodiment of the present invention, there is provided a method of removing impurities present in petroleum during the refining thereof, said method comprising the steps of:
  providing a petroleum product to be refined;
  providing a caustic composition comprising:
    a caustic component;
    an alkanolamine additive adapted to provide an extended buffering effect to the caustic composition when such is exposed to acid; and
    water;
  adding said caustic composition to said petroleum product to be refined; and
  allowing said caustic composition and petroleum product to be refined to remain in contact with one another for a period of time determine to be sufficient for the sufficient removal of at least one of carbon dioxide and sulfur-containing compounds.

According to a preferred embodiment of the present invention, there is provided the use of a caustic composition according to the present invention, for the control of pH of drilling fluids.

According to another preferred embodiment of the present invention, there is provided the use of a caustic composition according to the present invention, for the breaking down of organic matter present in petroleum during the refining thereof.

According to a preferred embodiment of the present invention, there is provided the use of a caustic composition according to the present invention, for the removal of various impurities during the refining stage of petroleum production. Preferably, the impurities are selected from the group consisting of: carbon dioxide and sulfur-containing compounds.

According to a preferred embodiment of the present invention, there is provided a use of the composition according to present invention in a process for the treatment of water.

According to a preferred embodiment of the present invention, there is provided an aqueous caustic composition comprising:
  a caustic component;
  an alkanolamine additive adapted to provide an extended buffering effect to the caustic composition when such is exposed to acid; and water;
wherein the caustic component is present in a concentration of up to 40 wt % of the composition and the caustic component and the alkanolamine additive are present in a molar ratio ranging from 15:1 to 5:1. Preferably, the caustic component and the additive are present in a molar ratio ranging from 12:1 to 8:1. Preferably, the caustic component comprises: a hydroxide anion and a monovalent cation.

According to a preferred embodiment of the present invention, there is provided a use of a buffered caustic solution in water treatment, wherein said buffered caustic solution comprising:
- a caustic component;
- an alkanolamine additive adapted to provide an extended buffering effect to the caustic composition when such is exposed to acid; and
- water;
- wherein the caustic component is present in a concentration of up to 40 wt % of the composition and the caustic component and the additive are present in a molar ratio ranging from 15:1 to 5:1;

According to a preferred embodiment of the present invention, there is provided a method to treat water, wherein said method comprises the steps of:
- providing an aqueous caustic composition comprising:
  - a caustic component;
  - an alkanolamine additive adapted to provide an extended buffering effect to the caustic composition when such is exposed to acid; and
  - water;
  - wherein the caustic component is present in a concentration of up to 40 wt % of the composition and the caustic component and the alkanolamine additive are present in a molar ratio ranging from 15:1 to 5:1;
- exposing a water requiring treatment to a pre-determined amount of said caustic composition for a period of time sufficient to effect the treatment intended.

According to a preferred embodiment of the present invention, there is provided a method for treating mine water from an ore deposit, wherein the mine water contains sodium carbonate and sodium bicarbonate, the method comprising:
- pumping the mine water from the ore deposit;
- introducing a tailings stream comprising an amount of the composition according to the present invention into the mine water to form a reaction solution;
- maintaining a pH of between about 11.5 and about 13 in the reaction solution;
- separating a treated mine water from the reaction solution to form a concentrate; and
- introducing the treated mine water into an alkali production process.

Although an embodiment was shown and described, it will be appreciated to those skilled in the art that various changes and modifications can be made to the embodiment described herein. The terms and expressions used in the above description have been used herein as terms of description and not of limitation, and there is no intention in the use of such terms and expressions of excluding equivalents of the features shown and described or portions thereof, it being recognized that the invention is defined and limited only by the claims that follow.

The invention claimed is:

1. An aqueous caustic composition comprising:
   a caustic component present in an amount ranging from 5 wt % to 40 wt %;
   an alkanolamine additive present in an amount ranging from 4 wt % to 15 wt %; and
   water,
   wherein the alkanolamine additive buffers a pH of the aqueous caustic composition between 8.25 and 10,
   wherein the alkanolamine additive is selected from the group consisting of monoethanolamine, diethanolamine, triethanolamine, aminomethyl propanol, propanolamine, dimethylethanolamine, N-methylethanolamine, and combinations thereof, and
   wherein the caustic component and the alkanolamine additive are present in a molar ratio ranging from 15:1 to 5:1.

2. The aqueous caustic composition according to claim 1, wherein the caustic component is selected from the group consisting of: potassium hydroxide; sodium hydroxide; lithium hydroxide; cesium hydroxide; rubidium hydroxide; and combinations thereof.

3. The aqueous caustic composition according to claim 1, wherein the caustic component is selected from the group consisting of: potassium hydroxide; sodium hydroxide; and combinations thereof.

4. The aqueous caustic composition according to claim 1, wherein the alkanolamine additive is monoethanolamine.

5. The aqueous caustic composition according to claim 1, wherein the alkanolamine additive is diethanolamine.

6. The aqueous caustic composition according to claim 1, wherein the alkanolamine additive is triethanolamine.

7. The aqueous caustic composition according to claim 1, wherein the caustic component is present in a concentration ranging from 10 to 30 wt % of the aqueous caustic composition.

8. The aqueous caustic composition according to claim 1, wherein the caustic component is present in a concentration ranging from 15 to 25 wt % of the aqueous caustic composition.

9. The aqueous caustic composition according to claim 1, wherein the caustic component is present in a concentration of approximately 25 wt % of the aqueous caustic composition.

10. The caustic composition according to claim 1, wherein the alkanolamine additive is present in a concentration ranging from 4 wt % to 10 wt % of the aqueous caustic composition.

11. An aqueous caustic composition consisting essentially of:
    a caustic component;
    an alkanolamine additive; and
    water;
    wherein the caustic component is present in a concentration of up to 40 wt % of the composition,
    wherein the caustic component and the alkanolamine additive are present in a molar ratio ranging from 15:1 to 5:1, and
    wherein the alkanolamine additive buffers a pH of the aqueous caustic composition between 8.25 and 10.

12. An aqueous caustic composition according to claim 11, wherein the molar ratio ranges from 12:1 to 8:1.

13. An aqueous caustic composition according to claim 11, wherein the caustic component comprises: a hydroxide anion and a monovalent cation.

14. The aqueous caustic composition according to claim 1, wherein the aqueous caustic composition has a freezing point of less than about −18° C.

15. The aqueous caustic composition according to claim 1, wherein the aqueous caustic composition has a freezing point of about −45° C.

16. The aqueous caustic composition according to claim 1, wherein an amount of the water is at least 45 wt %.

17. The aqueous caustic composition according to claim 9, wherein an amount of the water is 70 wt %.

18. The aqueous caustic composition according to claim 11, wherein the alkanolamine additive is selected from the group consisting of monoethanolamine, diethanolamine, triethanolamine, aminomethyl propanol, propanolamine, dimethylethanolamine, N-methylethanolamine, and combinations thereof.

* * * * *